United States Patent

[11] 3,596,011

[72] Inventor George Alexandrovich
Commack, N.Y.

[21] Appl. No. 808,244
[22] Filed Mar. 18, 1969
[45] Patented July 27, 1971
[73] Assignee Fairchild Sound Equipment Corporation
Long Island City, N.Y.

[54] GAIN-SWITCHING CIRCUITS
14 Claims, 1 Drawing Fig.

[52] U.S. Cl. .......... 179/170.2, 179/1 VL, 179/81 B
[51] Int. Cl. .......... H04b 3/20, H04m 1/60
[50] Field of Search .......... 179/170.2, 170.8, 81 B, 81 C, 1 A, 1 CN, 1 VL, 1 FS

[56] References Cited
UNITED STATES PATENTS
2,825,764 3/1958 Edwards et al. .......... 179/170.2
3,300,584 1/1967 Jeanlin .......... 179/1 VL

*Primary Examiner*—Kathleen H. Claffy
*Assistant Examiner*—William A. Helvestine
*Attorney*—Darby & Darby

ABSTRACT: A system for communication between two stations over lines, and particularly telephone lines, in which each station has a transmitter channel and a receiver channel. In response to an outgoing signal from one station the gain of the transmitter channel of that station is expanded by an expander circuit and the gain of the receiver channel at the same station is suppressed to prevent acoustical feedback. In response to an incoming signal from the transmitter channel station, the expander circuit in the transmitter channel of the first station is prevented from operating.

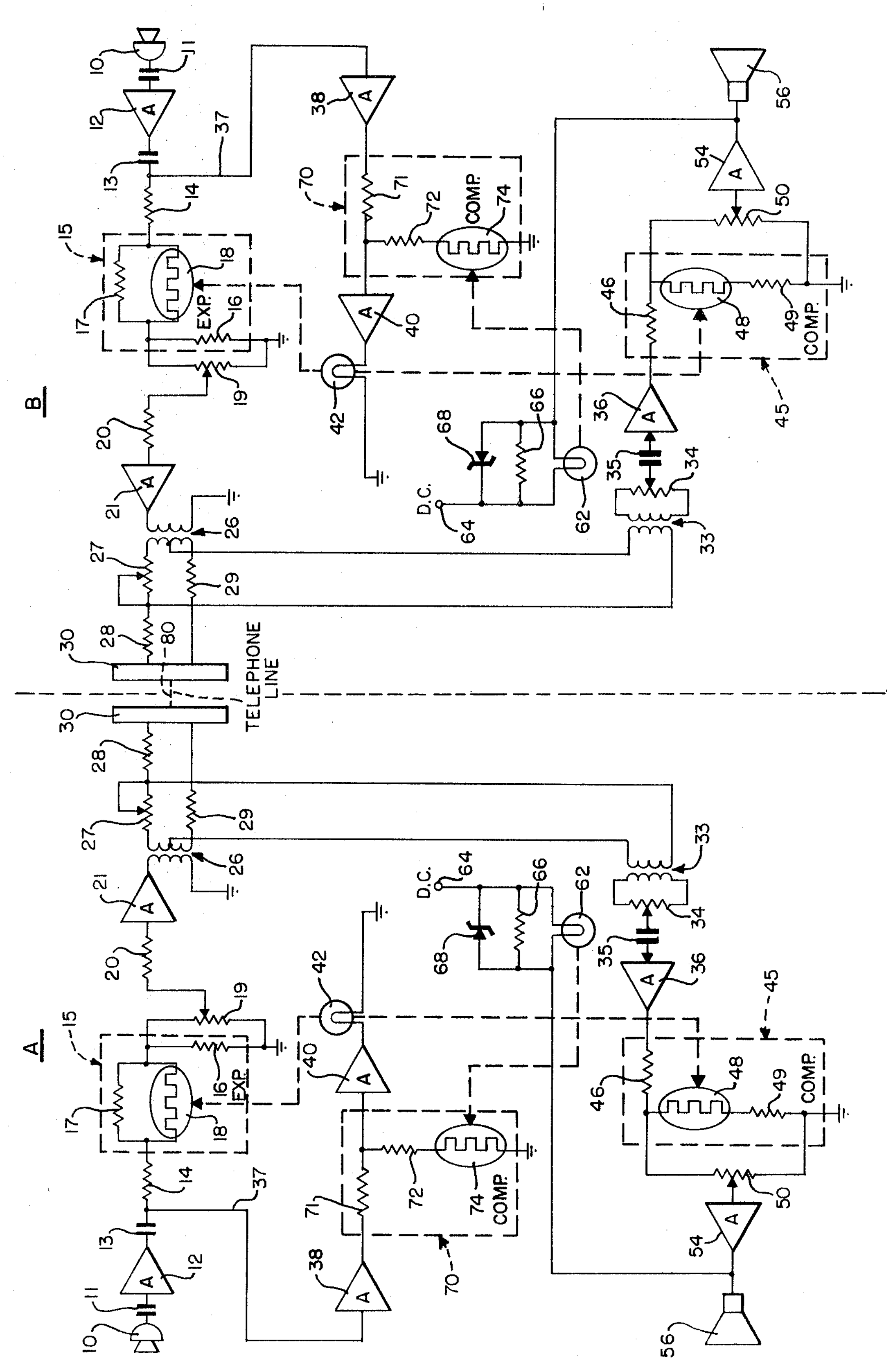
A
B
EXP.
COMP.
D.C.
TELEPHONE LINE

GAIN-SWITCHING CIRCUITS

In U.S. Pat. No. 3,168,619, issued Feb. 2, 1965, to Stevens H. Harrison, a two-way audio communication system is described for the prevention of acoustical feedback between a speaker and a microphone at each of a pair of stations. The system of the aforesaid Harrison patent provides between two stations two communication channels. In the first communication channel there is located at one station a microphone and at the second station in the same channel a speaker. The second channel comprises a speaker at the first station and a microphone at the second station. In accordance with that system, gain-switching devices, hereafter called "expanders" and "compressors" are used. The gain-switching devices are operated in a manner so that the gain of one channel at a station, for example that containing a microphone over which sound is being transmitted, is expanded or increased while the gain of the other channel at the same station containing the loudspeaker, is simultaneously compressed or decreased. This arrangement prevents acoustic coupling between the microphone and speaker of the two channels at the one station which would occur due to signals being fed back by the coupling from the loudspeaker to the microphone at the other station in response to the signals from said one station.

The gain-switching circuits of the aforesaid patent use light dependent resistors (hereafter called LDR's) which are controlled or actuated by a lamp. As is known in the art, these LDR's which can be in the form of cadmium sulfide cells, have a resistance characteristic which varies in accordance with the amount of light received thereby. In response to a large amount of light, the LDR has a low resistance while in response to little or more light, or a darkened condition, the LDR has a high resistance.

While the system of the aforesaid patent has several advantages, it has proven to be unsatisfactory for coupling two or more stations using gain-switching over a telephone line and particularly where two or more stations are to be coupled over telephone lines through a switchboard or dial apparatus, either automatic or semiautomatic. In such applications for communication between two or more stations over telephone lines, devices called hybrids are normally used. These devices permit bidirectional transmission of signals over the same line. However, it has been found that when such hybrids are used with gain-shifting systems of the type under consideration problems arise which seriously degrade system performance. This is due to the variations in impedance which occur over the telephone line, due to additional stations dropping in or out on the line, distance variations between stations, changes in performance of line amplifiers and couplers, etc. Further, since hybrids are frequency-responsive devices, they can usually only be tuned to a single frequency of operation and will not provide the required degree of separation between the incoming and outgoing signals at a station.

The present invention provides an apparatus for use with two or more stations which will permit bidirectional communication over a telephone line without the use of complicated hybrid networks and/or time-sharing arrangements. In accordance with the invention a novel circuit is provided which not only accomplishes the gain-shifting function of the aforesaid patent to prevent acoustical feedback from developing, but also effects blocking of one of the channels at a given station so that there can be no simultaneous bidirectional communication. This permits two stations to be used over a single telephone line or through a dial access system.

It is therefore an object of the present invention to provide a communication system using gain-shifting circuits. A further object is to provide a communication system using gain-shifting circuits in which one channel of the communication system at a station is blocked during reception of signals from the other station of the system.

An additional object is to provide a communication system between two or more stations in which each station has a microphone and a speaker and an arrangement is provided to block the microphone channel at a station during reception of signals produced at the microphone of the other station.

Other objects and advantages of the present invention will become more apparent upon reference to the following specification and annexed drawings, in which:

FIG. 1 is a schematic drawing, partially in block diagram form, of the system of the present invention.

Referring to FIG. 1, the system of the present invention is shown as comprising between first and second stations designated station A and station B, first and second communication channels. Each of stations A and B has a microphone and a loudspeaker with the overall function of the system being such that communication is to be carried out between the microphone at station A and reproduced by the speaker at station B (one channel of the system) and also between the microphone at station B which is to be reproduced by the loudspeaker at station A (second channel of the system).

Considering now the equipment located at station A, there is included a microphone 10 into which a person using the communication system speaks. The microphone is of any suitable conventional audio type. The signal from the output of microphone 10 is applied through a capacitor 11 which serves to keep DC voltage off the microphone to a preamplifier 12. The output of the preamplifier 12 is applied through a coupling capacitor 13 into an expander circuit 15. The expander circuit 15 is of a voltage divider type and includes a parallel-connected fixed resistor 17 and a light dependent resistor 18 which are connected in series by a resistor 14 with the output of the preamplifier 12. A fixed value resistor 16 is connected between the right end of the LDR and a point of reference potential, such as ground. The ends of a potentiometer 19 are connected across the output of the expander 15, that is across the resistor 16, and the sliding tap of the potentiometer picks off a desired amount of the expander output signal and applies it to a line amplifier 21 through a resistor 20.

As should be apparent, the magnitude of the signal present to be tapped off across the potentiometer 19, for application to the amplifier 21 will vary, depending upon the resistance of the LDR 18. For example, when the LDR 18 is in its high resistance state, the arm of the voltage divider formed by the parallel connection of resistor 17 and LDR 18 will have maximum resistance and therefore the voltage across the fixed resistor 16 and the potentiometer 19 will be minimum. Conversely, when LDR 18 is in its minimum resistance state, the resistor 16 will have more voltage dropped across it and the voltage across the potentiometer 19 will be maximum. This provides an increased amplitude signal voltage to the amplifier 21. Thus, the circuit 15 functions as an expander.

The amplifiers 12 and 21 heretofore referred to are of any suitable conventional audio type either vacuum tube, transistorized or of the integrated circuit type. All of the other amplifiers to be described are also conventional audio amplifiers, unless otherwise noted, which are capable of producing a predetermined amount of gain.

The output of the amplifier 21 is supplied to the primary winding of an output transformer 26. The secondary of the output transformer 26 is connected through an adjustable impedance matching network formed by a rheostat 27 and a resistor 28, connected in series between the upper end of the secondary winding and one input of a hybrid 30, and a resistor 29 connected between the lower end of the secondary winding of transformer 26 and the other input of hybrid 30.

The signal at the output of the preamplifier 12 is also applied over line 37 to an amplifier 36 which is also of any suitable, conventional audio type. The signal at the output of amplifier 36 is applied through a compressor circuit 70 to be described below to the input of another amplifier circuit 40. The amplifier circuit 40 preferably has a variable attack and release time circuit, such as, for example, of the type shown in the patent to George Alexandrovich and Keith Morris, U.S. Pat. No. 3,281,706, dated Oct. 25, 1966 which is assigned to the same assignee. The output of the amplifier 40 drives an incandescent lamp 42 whose function is to control the expander 15 and a compressor circuit 45 in the loudspeaker channel of station A. The use of the attack and release time circuit for amplifier 40 permits the lamp to energize rapidly and extinguish more slowly. This is also described in the aforesaid Harrison et al. patent.

The loudspeaker channel of station A operates from signals received from the microphone channel of station B over a telephone line 80. These signals pass through the hybrid 30 at station A into the transformer 26. The amplifiers 21 and 12 in a microphone channel block the incoming signals from station B from appearing in the microphone channel of station A. The incoming signals at the transformer 26 of the station A are tapped off across a portion of the secondary winding of the transformer between the center tap and one end of the rheostat 27. These incoming signals are applied to the primary winding of an input transformer 33. From the secondary winding of transformer 33 they are applied across the ends of a potentiometer 34 and coupled by the sliding tap of the potentiometer to the input of an audio amplifier 36 through a coupling capacitor 35.

The signal at the output of amplifier 36 is applied to compressor circuit 45 which includes a voltage divider formed by a resistor 46 connected to the output of the amplifier 36 and the series connection of an LDR 48 and a fixed resistor 49 between the other end of the resistor 46 and the point of reference potential. A potentiometer 50 has its ends connected across the output of the compressor circuit 45.

Circuit 45 is a compressor circuit because, as the resistance of LDR 48 decreases in response to increasing light, the value of the voltage appearing across the ends of the potentiometer 50 will decrease since the resistance of the series leg 48, 49 of the divider 46, 48, 49 will decrease and have less voltage appearing across it. Conversely, as the resistance of LDR increases, less compression is provided.

The incandescent lamp 42 in the output of amplifier 40 simultaneously controls both the expander and the compressor circuits 15 and 45 in the respective microphone and speaker channels.

The output signal across the potentiometer 50 is tapped off by the slider and applied to a power amplifier 54. One output of the amplifier 54 drives a speaker 56, which is also of conventional construction.

A second lamp 60 is also connected to the amplifier 54 which is of any conventional type, such as a push-pull amplifier. For example, considering that the amplifier 54 is a transistor circuit, the lamp 62 is connected in series between the collector of an output transistor in one side of the push-pull circuit and a point of DC potential 64. The operation of the amplifier 54 is such that when a signal is supplied to its input, current will be drawn through the transistor directly from the DC supply 64 causing the lamp 62 to light. A current-limiting arrangement in the form of a parallel connection of a resistor 66 and a zener diode 68 is connected across it to protect the lamp 62 from overload. It is preferred that the amplifier 54 be operated as a Class B amplifier, meaning that it will draw current only when the signal goes through it. Thus, the lamp 62 will be out at all times, unless there is a signal present. The lamp 62 will be illuminated therefore only in the presence of a signal through the amplifier 54 which occurs only when station A receives a signal from station B.

The lamp 62 controls compressor circuit 70 which is in the signal line between the output of the amplifier 36 and the input of the amplifier 40 which controls the lamp 42. The compressor circuit 70 includes a voltage divider formed by a series resistor 71 and a shunt leg to ground formed by a series-connected resistor 72 and LDR 74. In response to increased illumination from lamp 62, the resistance of LDR decreases causing a compressing action of any signal on the line between amplifiers 36 and 40. Thus, the compressor 70 controls the energization of lamp 42 which in turn controls the expander and compressor circuits 15 and 45.

The apparatus at station B is identical to that at station A. Therefore, the description of this apparatus will not be repeated. The same reference numerals are used with respect to station B as shown with respect to the components of the apparatus at station A.

The two stations A and B are coupled to each other through a telephone line 80 which, is a balanced-pair telephone line connected between the two hybrids 30. It should be understood that reference numeral 80 for the balanced-pair telephone line also includes any equipment on the telephone line such as switchboards, dial access circuits, line amplifiers, etc. As is well known in the art, such auxiliary equipment is needed on the telephone line in order to permit full utilization.

Considering now the operation of the circuit shown in FIG. 1, assume that a person at station A is speaking into the microphone 10. The signal at the microphone 10 is amplified by the preamplifier 12 which in conjunction with amplifier 36 has sufficient gain to produce a signal to operate the attack-release amplifier 40 and energize the lamp 42. In general, the microphone signal level is −80 db. A gain of approximately 60 db. is produced by the amplifiers 12 and 8 and the difference of −20 db. is sufficient to operate the amplifier 40 so that the lamp 42 is energized.

When the lamp 42 is energized and produces light, the expander circuit 15 is operated causing an increase in the gain in the microphone channel of station A. The signal from the microphone after going through expander circuit 15 passes to the amplifier 21, which is a line amplifier and has a gain which is sufficient to bring the outgoing signal from station A up to the level needed to be applied to the hybrid for subsequent transmission over the telephone line 80 to station B. Generally, the expander circuit 15 has a few db. insertion loss, in the order of 3 or 4 db. and, if the gain is to be brought up to a 0 db. level, the amplifier 21 should provide about 20 to 24 db. gain.

When the lamp 42 is energized it also actuates the compressor 45 in the loudspeaker channel of station A causing it to perform its compression function. This blocks any signals produced in the microphone channel of station A from cross coupling into the loudspeaker channel for amplification by amplifier 54 and reproduction by the loudspeaker 56. Since this cross coupling is prevented electrically, no acoustic signals can be produced in the loudspeaker 56 to give rise to acoustic feedback at station A.

The outgoing signal from the hybrid 30 of station A is supplied over the telephone line 80 and through any other line circuits, switchboards, etc., to the hybrid 3 of station B. The amplifier 21 at station B blocks the incoming signal from appearing in the microphone channel at station B and the incoming signal is directed to the input transformer 33. The signal at the input transformer 33 is amplified by the amplifier 36 and passes through the compressor circuit 45 to the power amplifiers 54. It should be understood that at this time the compressor circuit 45 of station B is not actuated since there is no one speaking into the microphone 10 at station B to energize lamp 42. From the output of amplifier 54 the signal is reproduced in the loudspeaker 56.

At the same time, the signal in the reproduction channel in station B causes the power amplifier 54 to draw current and energize the lamp 62. With lamp 62 energized, the compressor circuit 70 is actuated, blocking any signal from appearing at the input of amplifier 40 to energize it. This means that, during the time that the lamp 62 is energized, the signals in the microphone channel of station B cannot pass through the amplifier 40 to actuate the lamp 42. Thus, the lamp 42 is prevented from being illuminated during the time that station B is receiving a signal from station A. As should be understood, with the lamp 42 prevented from becoming energized, the expander 15 in the microphone channel of station B cannot be operated. However, the expander 15 is so constructed that, during the time lamp 42 is out, a signal from the microphone at station B can still be transmitted to station A but without the benefit of gain-shifting. To state it another way, under the condition of lamp 42 of station B being locked out from operating by the energization of lamp 62 due to a signal from station A, signals from the microphone at station B will be reproduced at station A but at reduced level. The compressor 45 at station A, even though actuated by lamp 42, since someone is speaking into microphone 10 at station A, will still permit a small amount of signal to pass to the amplifier 54 of station A to be reproduced. It should be understood that this signal from station B is of greater amplitude than the usual cross coupling signal produced wholly at station A, which the compressor 45 at station A blocks. This means that effectively the microphone channel of station B is partially blocked during the time that someone is speaking into the microphone at station A.

The system operates in a similar manner in the reverse situation. Thus, for example, considering now that someone is speaking into the microphone 10 at station B, this signal will actuate attack-release amplifier 40 to energize the lamp 42 at station B, operating its expander circuit 15 and its compressor circuit 45. This produces gain-shifting at station B so that an outgoing signal can be produced on the telephone line 80.

The signal from station B received by the hybrid 30 at station A is supplied to the power amplifier 54 at station A, causing the lamp 62 to be energized. This operates the compressor circuit 70 which blocks signals from the microphone channel of station A from actuating the amplifier 40 and the lamp 42. Thus, the expander 15 in station A is prevented from operating, meaning that the microphone channel in station A is partially blocked. As explained above, signals from station B can reach station A but at a reduced level.

In general, the gain-shifting at any given station, that is the amount of shifting in gain provided between a quiescent level and an operating level when someone is speaking at the station, is about 15 db. between the microphone and the loudspeaker channels.

With respect to the amplifier 40, which is the attack and release time circuit, it is preferred that this circuit be made variable. In general, an attack time of 2 to 10 milliseconds is preferred, that is the time between which a signal appears at the input of amplifier 40 and the lamp 42 begins to become illuminated. A longer release time, in the order of 100—300 milliseconds, that is the time after which a signal is removed from the input to amplifier 40 that it takes the lamp 42 to become extinguished. This range of release times is average for pauses between words or sentences. The use of the variable attack in release times permits adjustment of the system for best interjection capabilities. By interjection capabilities it is meant the ability of the system to provide communications with gain-shifting between two stations at which both parties are speaking and one interrupts or interjects the other person. Further, the slower release time gives smoother sounding system operation.

With respect to the various lamps 42 and 62 which are used to control the expander and compressor circuits, these lamps are perfectly of the incandescent type. The lamps are operated somewhat below their normal voltage ratings in order to provide prolonged life.

The system of the present invention has been demonstrated to be effective for communications over telephone lines through normal dial access systems. In general, the system at one station is hooked up to a telephone line through the hybrid and access is had to similar stations anywhere over the telephone lines in the usual dial manner. It has also been demonstrated that the system of the present invention is effective when several equipments of the type shown for a given station in FIG. 1 are connected across the same telephone line.

As should be apparent, the system of the present invention does not rely upon frequency responsive components or networks to produce the expansion or compression functions or blocking of the expansion function. Therefore, there is no effect of the impedance of the telephone line or dial access equipment on the system operation. In addition, no restrictions are placed on the telephone line for operation of the system. While the hybrid used is a frequency-responsive device, it is not relied upon in the present invention to block the gain-shifting operation in the station which is receiving signals from the other station. Also, the expansion and compression functions of the lamp 42 and the circuits 15 and 45 at the station are produced by signals at that station prior to the signals encountering the hybrid.

What I claim is:

1. Communications apparatus for operation to transmit and receive electrical signals between two stations comprising at one station:

signal transmission means including a gain expander means, signal-receiving means for receiving signals from another station, first means responsive to a signal produced at said one station for operating said gain expander means to increase the gain of said signal transmission means, and means responsive to a signal produced at another station and received by the receiving means of said one station for blocking the operation of the first means for operating said gain expander means.

2. Communication apparatus as in claim 1 wherein said signal-receiving means at said one station includes a gain compressor means, said first means operating in response to a signal produced at said one station for operating said compressor means to decrease the gain of said signal receiver means.

3. Apparatus as in claim 2 wherein said means for blocking the operation of said first means also blocks the operation of said gain compressor means of said signal receiver means.

4. Apparatus as in claim 3 wherein said gain expander means includes a light dependent resistor and said gain compressor means includes a light dependent resistor, and said first means includes first light-producing means responsive to the electrical signal produced at said one station for controlling the resistance of said two light dependent resistors.

5. Apparatus as in claim 4 wherein said blocking means comprises means for operating the light-producing means controlling the resistance of the light dependent resistor of said gain expander means to prevent said gain expander means from operating to increase the gain of said signal transmission means in response to a signal produced at said one station.

6. Apparatus as in claim 5 wherein said signal-blocking means includes a light dependent resistor, and means including a second light-producing means for operating said light dependent resistor of said blocking means in response to the signal in said signal reception means received from another station.

7. Communication apparatus between first and second stations over first and second channels comprising in said first channel at said first station a signal transmission means and at said second station a signal-receiving means, and having in said second channel at said first station signal-receiving means and at said second station signal transmission means, means responsive to a signal produced at one of said stations for increasing the gain of the channel of said one station including the transmission means and for decreasing the gain of the other channel of said one station, and means at said one station responsive to a signal received from the other station in the said other channel of said one station having the receiving means for blocking the gain-increasing means of said one channel of said one station from operating.

8. Apparatus as in claim 7 wherein said gain-increasing means at each station comprises an expander circuit means and said gain-decreasing means at each station comprises a compressor circuit means.

9. Apparatus as in claim 8 further comprising means at each station for simultaneously operating the expander circuit means and compressor circuit means of a said station simultaneously in response to a signal produced at said one station.

10. Apparatus as in claim 7 further comprising means for electrically coupling two channels of said two stations to transmit and receive signals from each other, and means at each station for preventing the signal in one channel from interacting with the other channel.

11. Apparatus as in claim 10 wherein said last-named means includes hybrid means.

12. Apparatus as in claim 7 wherein said expander circuit means and said compressor circuit means at each station includes a light dependent resistor and first means including a light-producing means at a station responsive to a signal produced in said transmission means of a said station for operating said light dependent resistor at said station to permit said expander circuit means and said compressor circuit means to operate to respectively increase and decrease the gain of the respective channels at said station.

13. Apparatus as in claim 12 wherein said first means includes another light dependent resistor and means including a second light-producing means responsive to the signal in the channel having the receiving means to operate said second light-producing means to control said other light dependent resistor to block operation of the expander circuit means of that station.

14. Apparatus as in claim 13 further comprising means for electrically coupling the two channels of said two stations to transmit and receive signals from each other, and means at each station for preventing the signal in one channel from interacting with the other channel.